United States Patent
Oscarsson et al.

(10) Patent No.: US 9,885,587 B2
(45) Date of Patent: Feb. 6, 2018

(54) HEADING SENSOR FOR DEFLECTOR ANGLE OF ATTACK ESTIMATION

(71) Applicant: PGS Geophysical AS, Oslo (NO)

(72) Inventors: Mattias Dan Christian Oscarsson, Osla (NO); Thomas Wennerod Firing, Barkaker (NO)

(73) Assignee: PGS Geophysical AS, Oslo (NO)

( * ) Notice: Subject to any disclaimer, the term of this patent is extended or adjusted under 35 U.S.C. 154(b) by 432 days.

(21) Appl. No.: 14/630,272

(22) Filed: Feb. 24, 2015

(65) Prior Publication Data

US 2015/0369627 A1    Dec. 24, 2015

Related U.S. Application Data

(60) Provisional application No. 62/013,786, filed on Jun. 18, 2014.

(51) Int. Cl.
| | |
|---|---|
| *G01C 19/00* | (2013.01) |
| *G01D 5/12* | (2006.01) |
| *G01V 1/38* | (2006.01) |

(52) U.S. Cl.
CPC ............ *G01D 5/12* (2013.01); *G01C 19/00* (2013.01); *G01V 1/3826* (2013.01)

(58) Field of Classification Search
CPC ......... G01V 1/3826; G01V 1/38; G01V 1/201
See application file for complete search history.

(56) References Cited

U.S. PATENT DOCUMENTS

| | | | |
|---|---|---|---|
| 4,033,278 A | 7/1977 | Waters | |
| 6,007,275 A | 12/1999 | Borseth | |
| 7,142,481 B1 | 11/2006 | Metzbower et al. | |
| 7,403,448 B2 * | 7/2008 | Welker | G01V 1/3826 114/245 |
| 8,228,756 B2 | 7/2012 | Toennessen | |
| 8,267,031 B2 | 9/2012 | Austad et al. | |
| 8,351,294 B2 | 1/2013 | Stokkeland et al. | |
| 2005/0270902 A1 | 12/2005 | Tonnessen | |
| 2006/0176774 A1 * | 8/2006 | Toennessen | G01V 1/3861 367/16 |
| 2006/0227658 A1 * | 10/2006 | Toennessen | G01V 1/3861 367/18 |
| 2008/0029012 A1 | 2/2008 | Stokkeland | |

(Continued)

OTHER PUBLICATIONS

European Search Report for European Application No. 15172159.4 dated Jan. 8, 2016.

*Primary Examiner* — Raj R Gupta

(57) ABSTRACT

Embodiments relate to coupling a heading sensor to a deflector surface reference for obtaining the deflector heading which can be used in estimation of the deflector angle of attack. A method may comprise: towing a plurality of streamers behind a survey vessel in a body of water, wherein at least one deflector provides a lateral component of force to the streamers; determining a deflector heading over ground using at least measurements from a heading sensor on a surface reference corresponding to the deflector; determining a deflector velocity over ground using at least measurements from a position sensor on the surface reference; determining a water current of the body of water; and estimating a deflector angle of attack based on inputs comprising the deflector heading, the deflector velocity over ground, and the water current.

24 Claims, 4 Drawing Sheets

(56) References Cited

U.S. PATENT DOCUMENTS

| | | |
|---|---|---|
| 2010/0254216 A1 | 10/2010 | Toennessen |
| 2011/0203509 A1* | 8/2011 | Austad .................. G01V 1/38 114/244 |
| 2011/0286302 A1* | 11/2011 | Welker ................ G01V 1/3826 367/16 |
| 2014/0064026 A1* | 3/2014 | Monk .................. G01V 1/3835 367/19 |
| 2014/0126333 A1 | 5/2014 | Lohrmann et al. |
| 2014/0167768 A1 | 6/2014 | Linfoot et al. |
| 2014/0233350 A1 | 8/2014 | Stokkeland et al. |

* cited by examiner

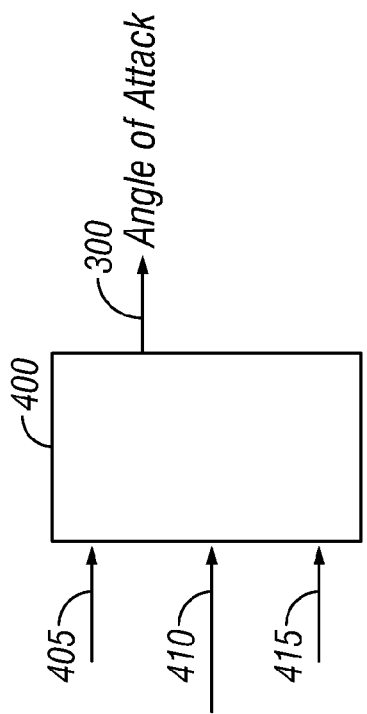
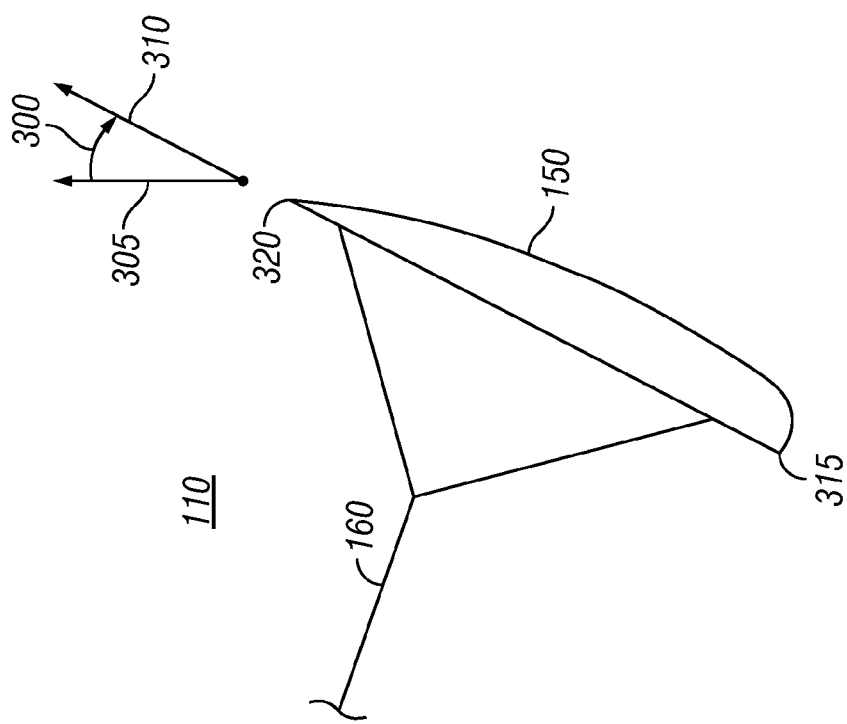

HEADING SENSOR FOR DEFLECTOR ANGLE OF ATTACK ESTIMATION

CROSS-REFERENCE TO RELATED APPLICATIONS

The present application claims priority to U.S. Provisional Application No. 62/013,786, filed on Jun. 18, 2014, the entire disclosure of which is incorporated herein by reference.

BACKGROUND

Embodiments relate generally to marine geophysical surveying and, more particularly, embodiments relate to coupling a heading sensor to a deflector surface reference for obtaining the deflector heading which can be used in estimation of the deflector angle of attack.

Techniques for geophysical surveying include marine geophysical surveying, such as seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more streamers also may be towed in the water at selected depths—typically above the seafloor—by the same or a different vessel. The streamers are typically cables that include a plurality of geophysical sensors disposed thereon at spaced apart locations along the length of the cable. Some geophysical surveys locate sensors on ocean bottom cables or nodes in addition to, or instead of, streamers. The geophysical sensors may be configured to generate a signal that is related to a parameter being measured by the geophysical sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the geophysical sensors on the streamers. The detected energy may be used to infer certain properties of the subsurface rock, such as structure, mineral composition and fluid content, thereby providing information useful in the recovery of hydrocarbons.

Current marine geophysical survey techniques may utilize multiple streamers towed at selected lateral distances from one another. Spreading devices are commonly used in geophysical surveying to achieve the desired lateral spread between the streamers. The spreading devices may include a variety of devices, such as doors, paravanes, steering rudders, collectively referred to herein as "deflectors." Vessel motions and water currents can produce a rather high variance of uncertainties in the estimation of deflector angle of attack.

BRIEF DESCRIPTION OF THE DRAWINGS

These drawings illustrate certain aspects of some of the embodiments of the present invention and should not be used to limit or define the invention.

FIG. 3 illustrates an example embodiment of deflector showing its angle of attack.

FIG. 4 illustrates an example embodiment of a data processing system that may be used in a deflector angle of attack estimation.

DETAILED DESCRIPTION

Figure 1:
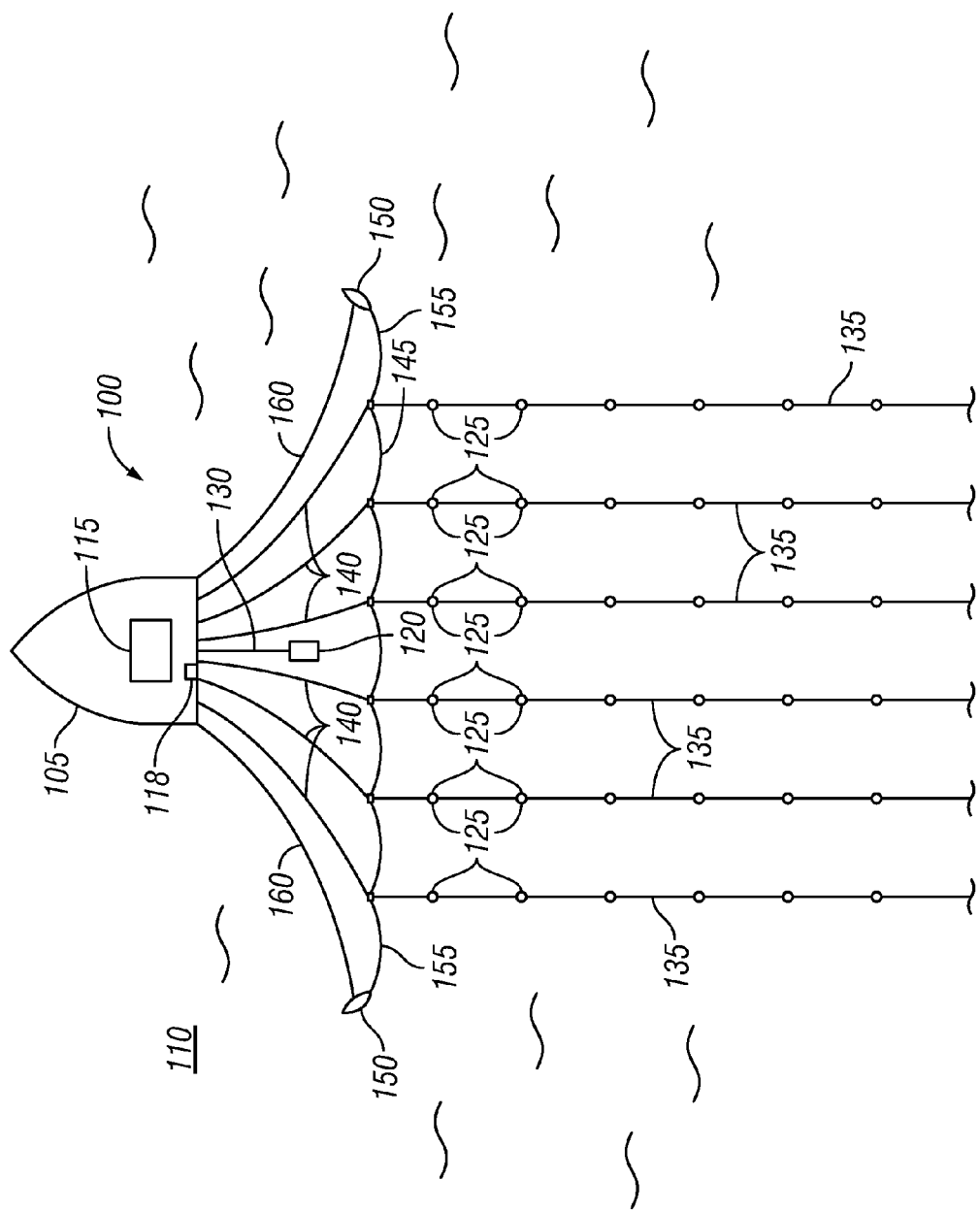
FIG. 1 illustrates an example embodiment of a geophysical survey system.

It is to be understood the present disclosure is not limited to particular devices or methods, which may, of course, vary. It is also to be understood that the terminology used herein is for the purpose of describing particular embodiments only and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include", and derivations thereof, mean "including, but not limited." The term "coupled" means directly or indirectly connected.

Embodiments relate generally to marine geophysical surveying. For example, the embodiments disclosed herein may have applications in marine seismic surveying, in which one or more seismic sources may be used to generate seismic energy that interacts with subsurface formations, and sensors—either towed or ocean bottom—may receive seismic energy generated by the seismic sources and affected by interaction with the subsurface formations. Likewise, the embodiments disclosed herein may also have applications in marine electromagnetic surveying, in which one or more electromagnetic sources may be used to generate electromagnetic fields that interact with subsurface formations, and electromagnetic sensors—either towed or ocean bottom—may receive the electromagnetic energy affected by the interaction with the subsurface formations.

Examples of the present embodiments may include use of a heading sensor such as a compass, gyroscope, or magnetometer for an angle of attack estimation of a deflector. For example, in a number of embodiments, a heading sensor may be coupled to a surface reference corresponding to a deflector with its heading measurements combined with water current measurements and position measurements in order to estimate an angle of attack of a deflector. Advantageously, by incorporation of the heading sensor into the surface reference—rather than the deflector itself—certain benefits may be achieved. For example, magnetic disturbances in the heading measurements may be minimized by placement on the surface reference, as motors or other equipment on the deflector can interfere with the heading sensor. By way of further example, space constraints on the deflector may make placement of the heading sensor on the deflector problematic, while the surface reference could include compartments or other areas for positioning of the heading sensor. Similar benefits may also be obtained by incorporation of the position sensor for position measurements into the surface reference rather than the deflector. In specific embodiments, the water current measurements may be taken at the survey vessel rather than at the deflector. By using the existing water current measurement system on the survey vessel, the additional expense of complexity of incorporating this system at the deflector may be avoided while also allowing for ease of service and replacement.

An example method may comprise towing a plurality of streamers behind a survey vessel in a body of water, wherein at least one deflector provides a lateral component of force to the streamers; determining a deflector heading over ground using at least measurements from a heading sensor on a surface reference corresponding to the deflector; determining a deflector velocity over ground using at least measurements from a position sensor on the surface reference; determining a water current of the body of water; and estimating a deflector angle of attack based on inputs comprising the deflector heading, the deflector velocity over ground, and the water current.

An example system may comprise: a heading sensor on a surface reference corresponding to a deflector; a position sensor on the surface reference; a current measurement system on a survey vessel; and a data processing system communicatively coupled to the heading sensor, position sensor, and current measurement system, wherein the data processing system is configured to estimate a deflector angle of attack for the deflector based on inputs comprising measurements from the heading sensor indicative of deflector heading, measurements from the position sensor indicative of deflector velocity over ground, and measurements from the current measurement system indicative of water current.

An example system may comprise: a survey vessel; a current measurement system on the survey vessel; a streamer coupled to the survey vessel for towing behind the survey vessel, wherein geophysical sensors are disposed on the streamer at spaced apart locations; a deflector coupled to the streamer; a surface reference coupled to the deflector for supporting the deflector in a body of water; a heading sensor on the surface reference; and a position sensor on the surface reference.

Referring now to FIG. 1, a marine geophysical survey system 100 is illustrated in accordance with example embodiments. As illustrated, the marine geophysical survey system 100 may include a survey vessel 105 moving along the surface of a body of water 110, such as a lake or ocean. The survey vessel 105 may include thereon equipment, shown generally at 115 and referred to for convenience as a "recording system." The recording system 115 typically may include devices (none shown separately) for navigating the survey vessel 105 (such as global positioning system ("GPS") receivers), for actuating at least one energy source 120, and/or for recording signals generated by geophysical sensors 125. The survey vessel may further include a water current measurement system 118, which may be used for determining the local water current of the body of water 110. A suitable water current measurement system 118 may include a variety of different devices, including a global positioning system, an acoustic pinger, and/or a magnetometer/gyroscope, which may provide information, such as vessel heading and vessel orientation, for determination of the water velocity. An example of a suitable water current measurement system 118 includes an acoustic Doppler current profiler (sometimes referred to as an ADCP or ADP), which uses acoustic beams to measure the water velocity remotely from the survey vessel 105.

As illustrated, the survey vessel 105 (or a different vessel) may tow the energy source 120 in the body of water 110. During operation, the energy source 120 may be triggered at selected times. When triggered, the energy source 120 may produce energy that emanates outwardly from the energy source 120. The energy may travel downwardly through the body of water 110 and into rock formations below the water bottom. A source cable 130 may couple the energy source 120 to the survey vessel 105. In the illustrated embodiment, the energy source 120 is towed below the surface of the body of water 110. As illustrated, the energy source 120 may be below the surface of the body of water 110 and above the water bottom, wherein the energy source 120 may be disconnected from the water bottom. For example, the energy source 120 may be towed in the body of water 110 at a depth ranging from 0 meters to about 300 meters. The energy source 120 may be any selectively actuable source suitable for marine geophysical surveying, including without limitation a seismic air gun, a water gun, a marine vibrator, an electromagnetic field transmitter, or an array of such devices. In some embodiments, seismic energy and/or electromagnetic energy may originate from the energy source 120. The energy source 120 may be towed in any suitable pattern for geophysical surveying, including in a parallel or orthogonal pattern, or possibly a circular or spiral pattern. It should be noted that, while the present example shows only a single energy source 120, the invention is applicable to any number of energy sources towed by the survey vessel 105 or any other vessel.

As illustrated in FIG. 1, the marine geophysical survey system 100 may further include streamers 135, which may be spaced apart laterally and/or vertically. "Lateral" or "laterally," in the present context, means transverse to the direction of the motion of the survey vessel 105. Geophysical sensors 125 may be disposed on the streamers 135 at spaced apart locations. The streamers 135 may each be formed, for example, by coupling a plurality of streamer segments end-to-end as explained in U.S. Pat. No. 7,142, 481, the disclosure of which is incorporated herein by reference. In one embodiment, streamers 135 may each include one or more lateral force and depth ("LFD") control devices (not shown). The LFD control devices may be deployed, for example, to regulate streamer depth so that the streamers 135 may be kept at a selected depth profile (e.g., as level as possible) while towed through the body of water 110. The LFD control device may be any of a variety of different devices suitable for regulating streamer depth, including "birds" having variable-incidence wings. It should be noted that, while the present example, shows only six streamers 135, the invention is applicable to any number of laterally spaced apart streamers 135 towed by survey vessel 105 or any other vessel. For example, in some embodiments, 8 or more laterally spaced apart streamers 135 may be towed by survey vessel 105, while in other embodiments, up to 26 laterally spaced apart streamers 135 may be towed by survey vessel 105.

In the illustrated embodiment, the streamers 135 may be coupled to the survey vessel 105 using a one or more lead-in lines, such as lead-in lines 140. The lead-in lines 140 may be used, for example, to deploy the streamers 135 from the survey vessel 105 and to maintain the streamers 135 at a selected distance behind the survey vessel 105. As illustrated, the lead-in lines 140 may be coupled at one end to the survey vessel 105 and at the other end to the corresponding one of the streamers 135. In some embodiments, a lead-in line 140 may couple to multiple streamers 135. The lead-in lines 140 may be, for example, any of a variety of spoolable lines suitable for use in geophysical survey systems, including, without limitation, fiber ropes, armored cables, or any similar device or combination thereof.

In the illustrated embodiment, the streamers 135 may be coupled at their forward ends to one or more spreader lines 145, which extend between the streamers 135. As illustrated, the spreader lines 145 may interconnect the streamers 135. In general, the spreader lines 145 may extend in the body of water 110 essentially transversely to the direction of motion of the survey vessel 105. For example, when maintained in correct tension, spreader lines 145 may help to maintain the lateral positions of the forward ends of the streamers 135. The spreader lines 145 may be, for example, any of a variety of lines suitable for use in electromagnetic survey systems, including, without limitation, fiber ropes, armored cables, or any similar device or combination thereof. While FIG. 1 illustrates a particular towing configuration using lead-in lines 140 and spreader lines 145, it should be understood that other towing configurations that may use more or less lines and/or different arrangements thereof may be used in accordance with present embodiments.

The geophysical sensors 125 may be disposed at spaced apart locations on the streamers 135. The geophysical sensors 125 may be any type of sensor known in the art. While not shown, some geophysical surveys may locate the geophysical sensors 125 on ocean bottom cables or nodes in addition to, or instead of, the streamers 135. The geophysical sensors 125 may be any type of geophysical sensor known in the art, including seismic sensors, such as hydrophones, geophones, particle velocity sensors, particle displacement sensors, particle acceleration sensors, or pressure gradient sensors, or electromagnetic field sensors, such as electrodes or magnetometers. The geophysical sensors 125 may detect energy that originated from the energy source 120 after it has interacted with the rock formations. By way of example, the geophysical sensors 125 may generate signals, such as electrical or optical signals, in response to the detected energy. Signals generated by the geophysical sensors 125 may be communicated to the recording system 115. The detected energy may be used to infer certain properties of the subsurface rock, such as structure, mineral composition and fluid content, thereby providing information useful in the recovery of hydrocarbons.

In accordance with an embodiment of the invention, a geophysical data product may be produced. The geophysical data product may include geophysical data obtained from one or more of the geophysical sensors 125 and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

As illustrated, the marine geophysical survey system 100 may further include deflectors 150. The deflectors 150 may be any type of deflector known in the art, such as doors, paravanes, steering rudders, and the like. One example of a suitable deflector includes a wing-shaped body used to generate lateral thrust. Another example of a suitable deflector includes one or more foils that generate lateral thrust as towed through the body of water 110. As illustrated, the deflectors 150 may be coupled to the streamers 135. In one embodiment, spur lines 155 may couple the streamers 135 to the deflectors 150. The spur lines 155 may be any of a variety of lines suitable for use in electromagnetic survey systems, including, without limitation, fiber ropes, armored cables, or any similar device or combination thereof. Deflector lead-in lines 160 may couple the deflectors 150 to the survey vessel 105. In alternative embodiments (not shown), deflector lead-in lines 160 are not used. It should be noted that, while the present example shows only two deflectors 150, the invention is applicable to any number of deflectors 150 that may be used as desired for a particular application. In some embodiments, the deflectors 150 may be remotely controlled, for example, to control the angle of attack. Deflector angle of attack will be described in more detail below with respect to FIG. 3.

Figure 2:
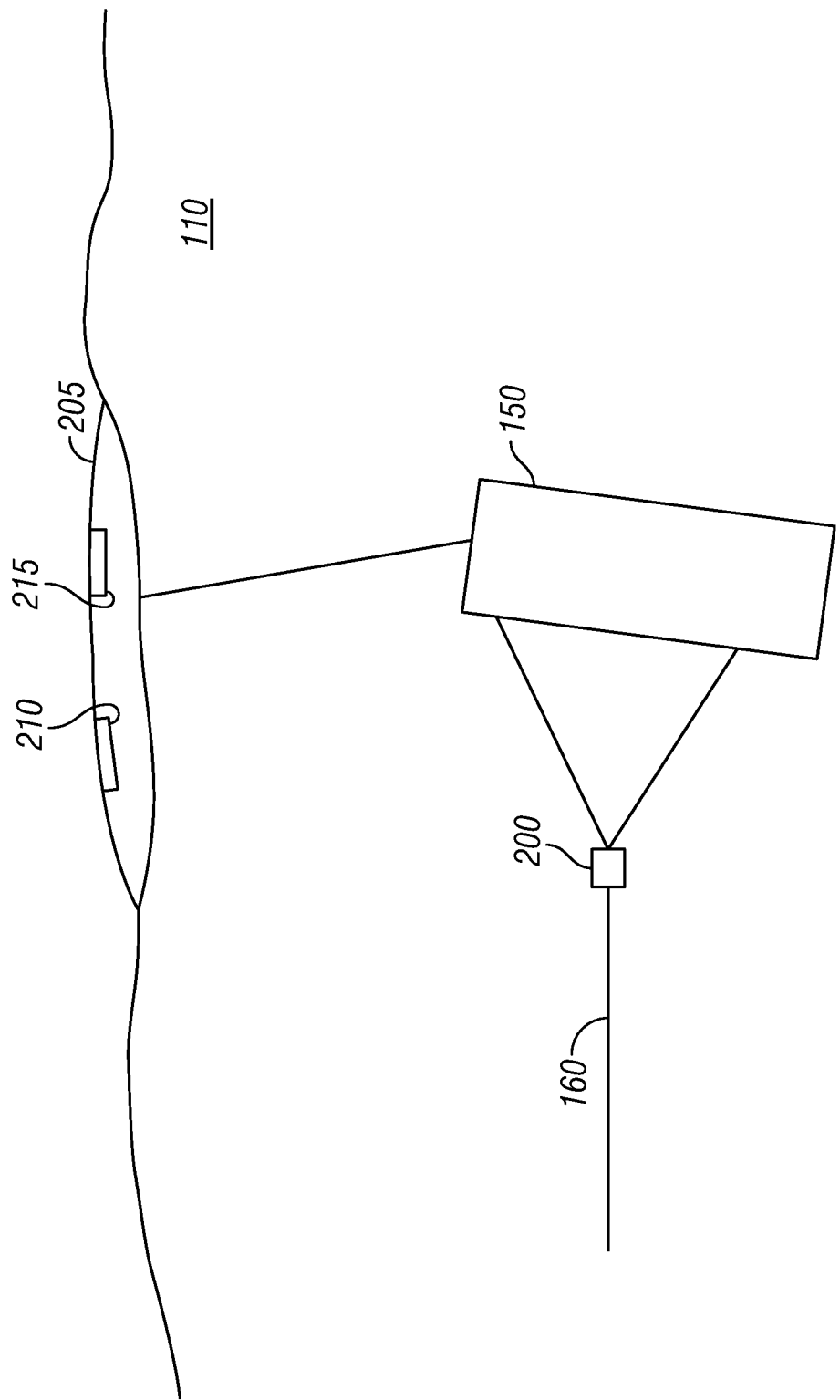
FIG. 2 illustrates an example embodiment of a deflector with a corresponding surface reference that includes a heading sensor and a global positioning system.

Turning now to FIG. 2, a deflector 150 is shown in more detail in accordance with an example embodiment. As illustrated, the deflector 150 may be towed by a deflector lead-in line 160. The deflector 150 may include a tension sensor 200, such as a strain gauge or load cell, positioned proximate deflector lead-in line 160. The tension sensor 200 may be an electrical sensor, such as a Wheatstone bridge type sensor or an optical sensor, such as Bragg grating etched into an optical fiber. The tension sensor 200 may also be a hydrostatic pressure sensor, such as piezoelectric type sensors. Measurements made by the tension sensor 200 may be provided to the recording system 115 (see FIG. 1) for analysis and control. From the tension sensor 200, deflector lift and deflector drag may be determined.

As illustrated on FIG. 2, a surface reference 205 may be coupled to the deflector 150. The surface reference 205 may help to support the deflector 150 in the body of water 110. As illustrated, the surface reference 205 may be at the surface of the body of water 110. Any type of surface reference 205 may be used, including a float, buoy, or other suitable flotation device.

The surface reference 205 may include a heading sensor 210 and a position sensor 215. The heading sensor 210 and position sensor 215 may be coupled to, disposed on, integrated into, or otherwise attached to the surface reference 205. The heading sensor 210 may include any suitable sensor for determining heading of the surface reference 205, including without limitation a magnetometer, a gyroscope, or a compass. The heading of the surface reference 205 may generally correspond to the heading of the corresponding deflector 150. The position sensor 215 may include any suitable sensor, such as a global positioning system sensor, which can be used to provide information on the location of the surface reference 205 as a function of time. The location of the surface reference 205 may generally correspond with the location of the deflector 150. From the location information of the surface reference 205, the velocity of the deflector 150 over ground can be determined. The heading sensor 210 and position sensor 215 may communicate with the recording system 115 (e.g., FIG. 1) via a wireless link, such as a radio link. As will be discussed in more detail below, information from the heading sensor 210 may be combined with location information from the position sensor 215 and water current measurements from the water current measurement system 118 (e.g., FIG. 1) to estimate the angle of attack of the deflector.

FIG. 3 illustrates the angle of attack 300 for the deflector 150 in accordance with an example embodiment. As illustrated, the deflector 150 may be towed by deflector lead-in line 160. The angle of attack 300, sometimes referred as the "yaw" angle, is the angle formed between the direction of deflector forward motion 305 and deflector chord line 310. The deflector chord line 310 is an imaginary line that joins the leading edge 315 and trailing edge 320 of the deflector 150. The deflector forward motion 305 is the direction of the deflector's movement through the body of water 110 in the horizontal plane. The deflector forward motion 305 may not necessarily correspond with the direction of the survey vessel 105 (e.g., FIG. 1). For example, when the survey vessel 105 is turning the deflector forward motion 305 and the direction of the survey vessel 105 may differ.

As previously mentioned, measurement of the angle of attack 300 of the deflector 150 can facilitate operation of the deflector 150 as well as control of the entire survey spread. Knowledge of the angle of attack 300 may be beneficial in a number of different aspect for operation of the deflector 150, including, without limitation, preventing stall of deflector 150 due to too high an angle of attack 300, preventing collapse of deflector 150 due to low of an angle of attack 300, enabling operator to use the full range/potential of the deflector 150, and monitoring of deflector 150 efficiency. The angle of attack 300 may also be adjusted when the heading of the survey vessel 105 is changed to increase or decrease the lateral thrust as desired. Knowledge of the angle of attack may also be beneficial in control of the survey spread. For example, the angle of attack 300 can be adjusted to modify the lateral thrust generated by the deflector 150, thus increasing or decreasing the spread of the streamers 135 (e.g., FIG. 1) as desired for a particular application.

FIG. 4 illustrates use of example embodiment utilizing a data processing system 400 for estimation of the angle of attack. The data processing system 400 may include, for example, a processor, memory, and input/output devices. An example data processing system 400 is described in more detail in connection with FIG. 5. In some embodiments, the data processing system 400 may be a component of the recording system 115 (e.g., FIG. 1). In alternative embodiments, the data processing system 400 may be separate from the recording system 115. It should be understood that the data processing system 400 does not necessarily have to be located on the survey vessel 105. The data processing system 400 may be in signal communication, which may be wired or wireless communication, with the water current measurement system 118, the heading sensor 210, and the position sensor 215.

The data processing system 400 may be able to determine an estimate of the angle of attack 300 of the deflector 150 (e.g., FIG. 3) from a number of inputs. A first input may include deflector heading 405, which may correspond to the heading of the deflector 150 over ground. The deflector heading 405 may be determined based at least on measurements from the heading sensor 210 (e.g., FIG. 2). A second input may include deflector velocity 410, which may correspond to velocity of the deflector 150 over ground. The deflector velocity 410 may be determined based at least on measurements from the position sensor 215 (e.g., FIG. 2). A third input may include water current 415, which may correspond to the water current of the body of water 110 (e.g., FIG. 1). The water current 415 may be determined based at least on measurements from water current measurement system 118 (e.g., FIG. 1). One or more of the inputs may be provided to the data processing system 400 from another system, for example, a navigation system (not shown) may provide the deflector velocity 410 based on the GPS measurements, or one or more of the inputs may be determined by the data processing system 400 and used in determining the estimate of the angle of attack of the deflector 150.

Accordingly, the angle of attack 300 may be estimated in accordance with example embodiments. With the angle of attack 300, operation of the deflector 150 (e.g., FIG. 3) and of the entire spread of streamers 135 (e.g., 1) may be facilitated. In some embodiments, the angle of attack 300 and the deflector 150 lift may be compared. With this comparison, it may be possible to monitor changes in efficiency caused by either a failing component or marine growth on towed equipment, such as the deflector 150. In response to this comparison, remedial action may be taken. For example, the angle of attack 300 may be increased to return to the same deflector lift, but may result in increased draft and resulting decreased efficiency. By way of further example, the remedial action may include cleaning of the deflector 150 such scraping of the deflector 150 to remove marine growth (e.g., barnacles).

The deflector 150 lift may be determined based on measurements from the tension sensor 200 on the deflector 150 (e.g., FIG. 2). By way of example, the lift L can be estimated knowing the tension T from the tension sensor 200 (e.g., FIG. 2) using the known drag/lift relationship k. The lift can then be calculated according to the following equation:

$$L = \sqrt{\frac{T^2}{1+k^2}} \tag{1}$$

Wherein L is the deflector 150 lift, T is the measured tension, and k is the known drag/lift relationship.

An example technique for estimating the angle of attack 300 using deflector heading 405, deflector velocity 410, and water current 415 will now be described in more detail. For simplicity, it is assumed that the deflector heading and the direction of the reference line for the angle of attack 300 coincide, and the axis in the ground and the water coordinate system coincide.

The water current 415 (C) in reference to the ground coordinate system may be defined as follows:

$$C = \begin{pmatrix} C_x \\ C_y \end{pmatrix} \tag{2}$$

The deflector velocity 410 (G) in relation to ground coordinate system may be defined as follows:

$$G = \begin{pmatrix} G_x \\ G_y \end{pmatrix} \tag{3}$$

The deflector velocity 410 (W) in relation to water coordinate system may be defined as follows:

$$W = \begin{pmatrix} W_x \\ W_y \end{pmatrix} \tag{4}$$

Wherein the deflector velocity 410 (W) can be calculated according to the following:

$$W = G - C \tag{5}$$

The velocity direction (D) of the deflector 150 in relationship to the water coordinate system can be calculated according to the following:

$$D = \arctan\left(\frac{W_y}{W_x}\right) \tag{6}$$

The angle of attack 300 (AoA) can then be calculated using the deflector heading 405 (H) and the velocity direction D according to:

$$AoA = D - H \quad (7)$$

Figure 5:
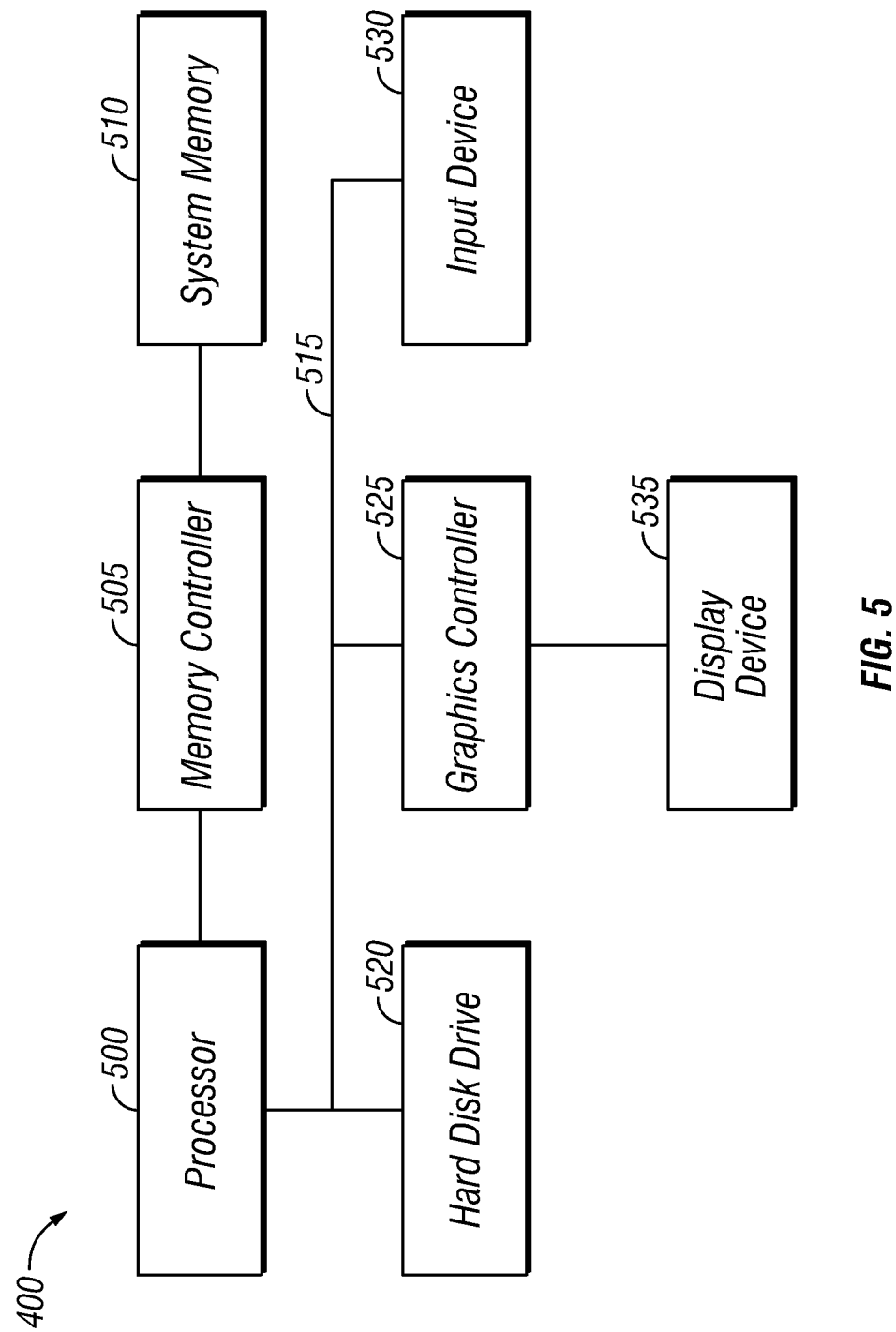
FIG. 5 illustrates an example data processing system and its respective inputs and outputs in a deflector angle of attack estimation.

FIG. 5 illustrates one embodiment of a data processing system 400 that may be utilized in accordance with embodiments of the present invention. In some embodiments, the data processing system 400 may be a component of the recording system 115 (e.g., FIG. 1). The data processing system 400 may be used for implementing embodiments of the techniques for estimation of the angle of attack 300 (e.g., FIG. 3). Special or unique software for receiving the inputs, data processing, and sending output signals may be stored in the data processing system 400 and/or on external computer readable media. Those of ordinary skill in the art will appreciate that the data processing system 400 may comprise hardware elements including circuitry, software elements including computer code stored on a machine-readable medium or a combination of both hardware and software elements. Additionally, the blocks shown on FIG. 5 are but one example of blocks that may be implemented. A processor 500, such as a central processing unit or CPU, may control the overall operation of the data processing system 400. The processor 500 may be connected to a memory controller 505, which may read data to and write data from a system memory 510. The memory controller 505 may have memory that includes a non-volatile memory region and a volatile memory region. The system memory 510 may be composed of a plurality of memory modules, as will be appreciated by one of ordinary skill in the art. In addition, the system memory 510 may include non-volatile and volatile portions. A system basic input-output system (BIOS) may be stored in a non-volatile portion of the system memory 510. The system BIOS is adapted to control a start-up or boot process and to control the low-level operation of the data processing system 400.

The processor 500 may be connected to at least one system bus 515 to allow communication between the processor 500 and other system devices. The system bus 515 may operate under a standard protocol such as a variation of the Peripheral Component Interconnect (PCI) bus or the like. In the example embodiment shown in FIG. 5, the system bus 515 may connect the processor 500 to a hard disk drive 520, a graphics controller 525 and at least one input device 530. The hard disk drive 520 may provide non-volatile storage to data that may be used by the data processing system 400. The graphics controller 525 may be in turn connected to a display device 535, which may provide an image to a user based on activities performed by the data processing system 400. The memory devices of the data processing system 400, including the system memory 510 and the hard disk drive 520 may be tangible, machine-readable media that store computer-readable instructions to cause the processor 500 to perform a method according to an embodiment of the present techniques.

If there is a conflict in the usages of a word or term in this specification and or more patent or other documents that may be incorporated herein by reference, the definitions that are consistent with this specification should be adopted for the purposes of understanding this invention.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed:

1. A method comprising:
    towing a plurality of streamers behind a survey vessel in a body of water, wherein at least one deflector provides a lateral component of force to the streamers;
    determining a deflector heading over ground using at least measurements from a heading sensor on a surface reference corresponding to the deflector;
    determining a deflector velocity over ground using at least measurements from a position sensor on the surface reference;
    determining a water current of the body of water;
    estimating a deflector angle of attack based on inputs comprising the deflector heading, the deflector velocity over ground, and the water current;
    adjusting the deflector angle of attack to modify lateral thrust generated by the at least one deflector in response to the step of estimating the deflector angle of attack; and
    adjusting a location of the plurality of streamers as the survey vessel moves in the body of water.

2. The method of claim 1, further comprising determining a deflector lift and comparing the deflector angle of attack and the deflector lift.

3. The method of claim 2, further comprising sending a signal to the deflector to adjust the actual deflector angle of attack in response to the step of comparing the deflector angle of attack and the deflector lift.

4. The method of claim 2, wherein the deflector lift is determined using at least measurements from a tension sensor on a lead-in line for the deflector.

5. The method of claim 2, further comprising cleaning the deflector in response to the step of comparing the deflector angle of attack and the deflector lift.

6. The method of claim 1, wherein the water current is determined using at least measurements from a water current measurement system on the survey vessel.

7. The method of claim 1, wherein heading sensors comprises a global positioning system sensor, and wherein the surface reference comprises a float that supports the deflector in the body of water.

8. The method of claim 1, wherein the position sensor comprise a magnetometer.

9. The method of claim 1, wherein the deflector comprises at least one of a door, a paravane, or a steering rudder.

10. The method of claim 1, wherein the heading sensor comprises at least one of a compass, a gyroscope, or a magnetometer.

11. A system comprising:
    a heading sensor on a surface reference corresponding to a deflector;
    a position sensor on the surface reference;
    a current measurement system on a survey vessel; and
    a data processing system communicatively coupled to the heading sensor, position sensor, and current measurement system, wherein the data processing system is configured to estimate a deflector angle of attack for the deflector based on inputs comprising measurements from the heading sensor indicative of deflector heading, measurements from the position sensor indicative of deflector velocity over ground, and measurements from the current measurement system indicative of water current, wherein the data processing system is further configured to adjust the deflector angle of attack to modify lateral thrust generated by the deflector in response to the estimated deflector angle of attack to move a plurality of streamers, wherein the deflector provides movement to a plurality of streamers.

12. The system of claim 11, further comprising a tension sensor on a lead-in line for the deflector.

13. The system of claim 11, wherein the heading sensor comprises a global positioning system sensor, and wherein the surface reference comprises a float configured to support the deflector in a body of water.

14. The system of claim 11, wherein the position sensor comprise a magnetometer.

15. The system of claim 11, wherein the deflector comprises at least one of a door, a paravane, or a steering rudder.

16. The system of claim 11, wherein the heading sensor comprises at least one of a compass, a gyroscope, or a magnetometer.

17. A system comprising:
a survey vessel;
a current measurement system on the survey vessel;
a streamer coupled to the survey vessel for towing behind the survey vessel, wherein geophysical sensors are disposed on the streamer at spaced apart locations;
a deflector coupled to the streamer;
a surface reference coupled to the deflector for supporting the deflector in a body of water;
a heading sensor on the surface reference; and
a position sensor on the surface reference.

18. The system of claim 17, further comprising a data processing system communicatively coupled to the heading sensor, position sensor, and current measurement system, wherein the data processing system is configured to estimate a deflector angle of attack for the deflector based on inputs comprising measurements from the heading sensor indicative of deflector heading, measurements from the position sensor indicative of deflector velocity over ground, and measurements from the current measurement system indicative of water current.

19. The system of claim 17, further comprising a tension sensor on a lead-in line for the deflector.

20. The system of claim 18, wherein the data processing system is further configured to adjust the deflector angle of attack to modify lateral thrust generated by the deflector in response to the estimated deflector angle of attack.

21. The system of claim 17, wherein the heading sensor comprises a global positioning system sensor, and wherein the surface reference comprises a float configured to support the deflector in a body of water.

22. The system of claim 17, wherein the position sensor comprise a magnetometer.

23. The system of claim 17, wherein the deflector comprises at least one of a door, a paravane, or a steering rudder.

24. The system of claim 17, wherein the heading sensor comprises at least one of a compass, a gyroscope, or a magnetometer.

* * * * *